May 28, 1968 C. F. RAULE 3,385,250
APPARATUS FOR CONNECTION TO SUBMERGED OBJECTS
Filed Aug. 8, 1966
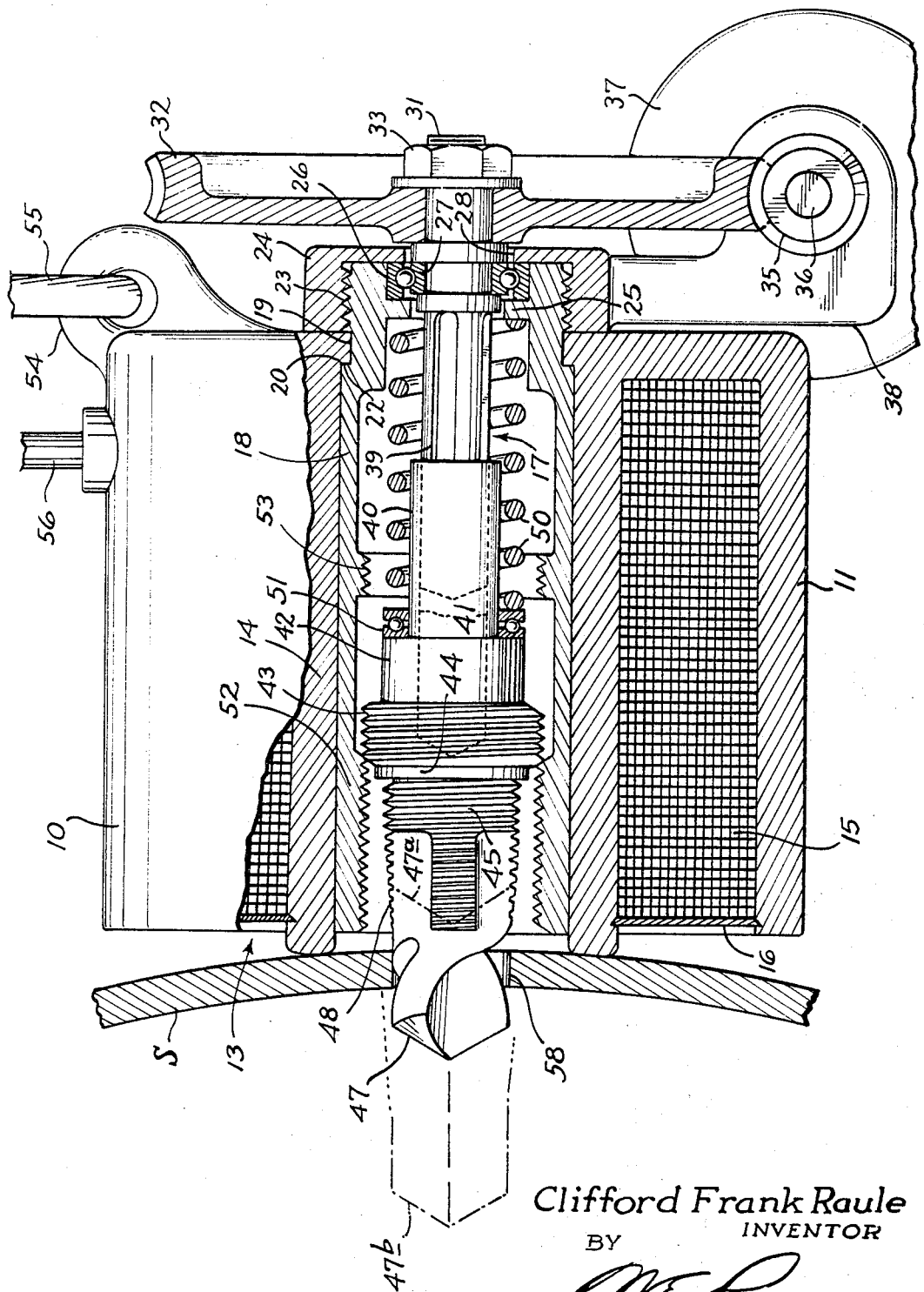
Clifford Frank Raule
INVENTOR
BY
Atty.

United States Patent Office 3,385,250
Patented May 28, 1968

3,385,250
APPARATUS FOR CONNECTION TO SUBMERGED OBJECTS
Clifford F. Raule, 717 Birchwood Drive,
Hillsboro, Oreg. 97123
Filed Aug. 8, 1966, Ser. No. 570,988
2 Claims. (Cl. 114—44)

ABSTRACT OF THE DISCLOSURE

This invention concerns a submersible salvaging device which may be lowered into proximity with a submerged object which is magnetically attractable. It has a compound drilling and tapping tool, both formed upon the same body which first pierce the object by drilling a hole through the hull and immediately tap it to secure the device thereto under positive drive and bias.

---

This invention relates generally to the salvaging of sunken ships or other objects and more particularly pertains to apparatus of a character capable of obtaining a secure hold on such objects in order that the objects can be lifted or otherwise maneuvered by salvage equipment on the surface.

Various types of apparatus have heretofore been devised for connection to sunken ships or other submerged objects in the art of salvaging such objects. Some of such apparatus, so devised, has been in the form of grapples for bodily grasping the submerged objects; some have used hooks or the like which penetrate the objects; and others have used magnets and are connected to the objects solely by the magnetic holding force of the magnets. Although such apparatus just mentioned is successful to a certain degree for the intended purpose, all have deficiencies in their structure and operation.

For example, the grapple-type structure of necessity must be heavy and cumbersome in order to encircle the submerged object, and furthermore such structure requires heavy equipment to handle it from the surface. The same is substantially true of the type of apparatus that utilizes penetrating hooks, and even more, these two types of apparatus generally require divers to assure the placement of the grapples or hooks since it is difficult if not impossible to maneuver the grapples or hooks precisely into holding position. Frequently, the sunken object is submerged to a depth wherein a grappling operation cannot be observed from the surface and furthermore the depth may be such that divers cannot be used to place the grapples or hooks in place.

Apparatus which serve to grapple a submerged object solely by the attracting force of magnets must be extremely heavy and cumbersome since a great number of large magnets have to be used to produce equilibrium and supply the required lifting force to insure lifting the object body. In addition to being heavy and cumbersome, most of the equipment heretofore used is extremely costly.

It is therefore a primary objective of my invention to provide apparatus adapted for connection to a submerged metal object which is simple in its construction and operation but which at the same time obtains a positive connection to such submerged object.

Another object of my invention is to provide apparatus adapted for connection to a submerged metal object which employs magnet means for initially attaching the apparatus to the object and which also employs power actuated penetrating means for securing the apparatus mechanically thereto, whereby the submerged object can be lifted or maneuvered, as desired. The magnet is of such strength only to attach the apparatus to the submerged object initially so the penetrating mechanism can drill a hole into the object for achieving positive mechanical engagement. In addition to serving as an initial attaching means, it is apparent that the magnet serves also as a sensing means in that when the apparatus is brought into close proximity with the object to be salvaged it will be attracted to and be attached to said ferrous object, which is immediately known by the crew at the surface and indicates that the article has been located.

A more particular object is to provide apparatus of the type described which employs an electro-magnet for securing the apparatus initially to a submerged object. It is in the form of an annulus for accommodating a boring and tapping assembly which is capable of powered projection to (1) bore a hole in the hull of the submerged object, (2) form screw threads in the bored hole, and (3) screw fit a portion of the apparatus in the tapped hole thereby to provide a positive connection between the submerged object and the securing apparatus.

These and other objects and advantages of my invention will be defined hereinafter with reference to the accompanying drawing which comprises a side elevational view of the apparatus, a portion of this view being broken away to illustrate internal mechanism. This view shows the apparatus in a stage of operation wherein an initial magnetic connection has been made with a submerged object and a boring and tapping assembly thereof has cut into the object to produce a positive connection therewith.

With particular reference to the drawing, the present apparatus comprises an enveloping housing 10 including a circumferential peripheral wall 11 and a rear end wall 12. The forward end 13 of the housing is apertured but sealed. Housing 10 has a central, annular hub 14 which serves as the core of an electro-magnet. The coil 15 of the electro-magnet is sealed in the annular space between the hub 14 and the circumferential wall 11 of the housing, at the proximate end of the housing a water-tight seal is provided by an imperforate end plate 16.

The forward end of the hub 14 projects outwardly beyond the front end of housing 10, and as will be more apparent hereinafter, this projecting portion of the core is adapted to engage a submerged object S and hold the housing securely thereagainst by magnetic attraction while a boring and tapping assembly incorporated in the apparatus provides a positive mechanical grip upon the object.

Such a boring and tapping assembly is designated generally by the numeral 17 and will now be described. Disposed in the central portion or interior of the annular hub 14 is an elongated hollow sleeve 18 the forward or proximate end of which is substantially flush with the forward end of the housing and the rearward or distal end of which projects through an aperture 19 in the rear end wall 12 of the housing. Aperture 19 is slightly smaller than the interior diameter of the hub 14 to form a forwardly directed shoulder 20, and the rearward end of the sleeve 18 is of reduced diameter to form a rearwardly directed shoulder 22 for abutment with the shoulder 20. The projecting portion of sleeve 18 has external screw threads 23 for receiving a cap 24 which holds the sleeve securely in place with the shoulders 20 and 22 in abutment.

The sleeve 18 has an inwardly directed, annular projection 25 spaced a short distance inwardly from the rearward end thereof which forms an end opening socket 26 for a bearing 27 held in place by the cap 24. Cap 24 has a central aperture 28 therein. Disposed interiorly of the sleeve 18 and at the rearward end thereof is a shaft 31 journaled in the bearing 27 and projecting rearwardly through the apertured cap 24. The projecting end of shaft 31 has a gear 32 keyed or otherwise secured thereto, and such gear is held in place on the shaft between an end nut 33 and a rearward one of a pair of bearing holding flanges 34 for the bearing 27.

Gear 32 is driven by a worm gear 35 secured on the output shaft 36 of a reversible electric motor 37. Motor 37 is supported on a bracket arm 38 fixed to the cap 24.

The forward end of shaft 31 has external splines 39, and slidably mounted on the splined shaft portion is a body member 40 having an axial splined bore 41 leading inwardly from the rearward end thereof. Body member 40 has an enlarged head 42 the forward end of which has a short expanse of screw threads 43 and an integral abutment shoulder 44 forwardly of the screw threads. The diameter of the abutment shoulder 44 is slightly less than the outer diameter of the screw threads 43. Forwardly of the abutment shoulder 44 are additional screw threads 45 the diameter of which is less than the diameter of the abutment shoulder 44.

Leading forwardly from the screw threads 45 is a combination drill bit 47 and tap 48. Tap 48 leads into the screw threads 45 whereby the latter screw threads are arranged to be threaded directly into treads cut by the tap 48.

A compression spring 50 is mounted on the boring and tapping assembly 17 and has opposite abutting engagement between annular projection 25 of the sleeve and the rearward end of the head 42, whereby the body member and integrated structure are biased forwardly. Since the boring and tapping assembly is journaled, it is desired that the forward end of the spring 50 have a friction free engagement against the head 42. Such is accomplished by means of a suitable bearing 51.

The inner surface of the sleeve 18 has two screw thread sections 52 and 53. The threads 52 lead inwardly from the forward end of the sleeve, and the threads 53 are disposed rearwardly of the threads 52 and at about midway between the ends of the sleeve. These two sections of threads are engageable by the threaded head portion 43 and have a specific location and over-all length for a purpose to be described hereinafter.

Housing 10 has an integral eye 54 to which is connected a lifting line 55 extending to winch or other handling means on a vessel at the surface (not shown). Housing 10 also has electric cable means 56 leading thereinto for supplying circuit wires to the electro-magnet 15 and to the motor 37. Such circuitry is not detailed herein since it comprises conventional circuitry aadpted to energize the electro-magnet and to operate the motor in forward and reverse directions. It is self suggestive to a person skilled in the art.

OPERATION

Prior to the operation of the present apparatus, the boring and tapping assembly 17 is fully retracted into the housing before submersion. This is accomplished by operating the motor 37 in reverse if necessary to back off the threaded head portion 43 from the threads 52. When the portion 43 is disengaged rearwardly from the threads 52, the slidable portion of boring and tapping assembly, comprising the body member 40 and integrated structure, is pushed rearwardly against the action of spring 50 to retract the slidable portion to a position where threaded head portion 43 engages threads 53 of the sleeve 18. Then by again operating the motor 37 in reverse the slidable portion of the boring and tapping assembly is held in fully retracted position by threaded engagement of threads 43 and 53.

In such fully retracted position of the boring and tapping assembly, the tip of the drill bit lies within the housing, as designated by the phantom lines 47a. The slidable portion of the boring and tapping assembly has guided movement on the splined shaft, the splined interior 41 of the body portion 40 extending forwardly a distance sufficient to allow full retraction of such slidable portion.

With the boring and tapping assembly fully retracted the apparatus is lowered into the area of the submerged object, the electromagnet first being energized. When the apparatus comes into close proximity with a metallic object, such as a sunken vessel or missile, it magnetically attaches itself thereto in the manner shown in the drawing. Thereupon, the motor 37 is energized in a forward direction to rotate the boring and tapping assembly, it being remembered that screw threads 43 are engaged with threads 53 and the drill bit 47 is within the housing. After a few revolutions of the assembly, threads 43 disengage forwardly from threads 53 and the slidable portion of the boring and tapping assembly is thrust forcefully in a forward direction by the spring 50. Such forward movement of the assembly causes the drill bit to engage the submerged object S and such bit then drills a hole 58 in the object. In this drilling step, the threaded portion 43 moves freely through the area between the threads 52 and 53.

As the spring 50 forces the drill bit into the submerged object S, a resultant force acts rearwardly on the housing, and as an important feature of my invention, the electromagnet is of a sufficient magnetic strength to overcome the said forces and hold the housing securely against the submerged object while the hole is being bored.

After the drill bit has progressed a selected distance, namely, to the full line position shown in the drawing, the threaded portion 43 engages threads 52. Upon further rotation of the boring and tapping assembly, the slidable portion thereof is driven forwardly by the threaded engagement mentioned and eventually the assembly will have moved to a point where the tap 48 will cut threads in the hole. Finally, upon further movement of the slidable portion, as to the position designated by the numeral 47b, the threads 45 will have engaged the tapped hole. The motor 37 is stopped at the time the abutment shoulder 44 engages the outer surface of the submerged object, either by manual opening of a suitable switch by the operator or by an overload switch which may be provided in the circuit to the motor, in the usual manner.

It is apparent that when the threaded portion 45 of the boring and tapping assembly is threadedly engaged with the tapped hole in the submerged object a secure hold is provided on the object and it can be lifted by the line 55 or maneuvered as desired. Two or more of the present units may be employed if one does not provide the desired mechanical hold or balance desired.

In addition to the features and advantages of my invention pointed out above, it is apparent that it serves as its own sensing and locating means in that when it comes into somewhat predetermined proximity with the submerged article it will be drawn thereagainst by the magnet. Not only does it attach itself to the object by the forces of magnetic attraction but it further secures itself by subsequent mechanical engagement, thus providing a connection much stronger than that of magnetic attraction.

Since the apparatus of my invention not only senses the submerged object but also attaches itself thereto, it can be used without employing divers and furthermore is functional for operation in murky water, or in deep water. Although it is described herein as means for lifting or maneuvering a submerged object, the line 55 extending thereto could as well serve as a guide for lowering auxiliary grapples or other attaching mechanism that perform the major lifting function.

It is to be understood that the form of my invention herein shown and described is to be taken as a preferred example thereof and that various changes in the shape, size and arrangement of parts may be resorted to without departing from the spirits of my invention as defined in the subjoined claims.

Having thus described my invention, I claim:

1. Apparatus for connection to a magnetically attracted submerged object comprising a housing arranged to be moved into proximity with the object, means on said housing for connecting a lifting line thereto, magnet means connected to said housing for attaching said housing to the object, and a journaled boring means in said housing having axial movement forwardly and rearwardly and operatively arranged to accommodate a forward movement thereof to project from said housing, and to bore into a submerged object to which the housing is magnetically secured, said magnet means possessing sufficient magnetic force to hold said housing securely against the object while said boring means is functioning, wherein said boring means includes a shaft portion, power operated means for rotating said shaft portion, a body member on said shaft portion rotatable therewith but slidable thereon to accomplish the forward and rearward axial movement of said boring means, a drill bit on said body member for boring a hole in the object, a tap on said body member for tapping the hole, screw threads on said body member arranged to engage the threads made in the hole in the object to attach said housing positively and mechanically to the object, and a threaded connection between said body member and said housing for moving the body member forwardly to accomplish tapping the hole in the submerged object and thereafter screw fitting its screw threads with the tapped threads made in the bored hole.

2. Apparatus for connection to a magnetically attracted submerged object comprising a housing arranged to be moved into proximity with the object, means on said housing for connecting a lifting line thereto, magnet means connected to said housing for attaching said housing to the object, and a journaled boring means in said housing having axial movement forwardly and rearwardly and operatively arranged to accommodate a forward movement thereof to project from said housing, and to bore into a submerged object to which the housing is magnetically secured, said magnet means possessing sufficient magnetic force to hold said housing securely against the object while said boring means is functioning, wherein said boring means includes a shaft portion, power operated means for rotating said shaft portion, a body member on said shaft portion rotatable therewith but axially slidable thereon to accomplish the forward and rearward axial movement of said boring means, a drill bit on said body member for boring a hole in the object, a following tap on said body member for tapping the hole, attaching screw threads on said body member arranged to engage the threads made in the hole in the object to secure mechanically said housing to the object, drive threads on a portion of said body member, a first threaded section in said housing arranged for engagement by said drive threads on said body member, a second threaded section in said housing disposed forwardly of said first threaded section and also arranged for engagement by said drive threads, the portion of said housing intermediate said first and second threaded sections being unthreaded, and means biasing said body member forwardly on said shaft whereby upon forward disengagement of said first threaded section and said drive threads the body member is moved forwardly by said biasing means to drive the drill bit against the submerged object, said second threaded section being arranged to move said body member forwardly upon rotation of the latter to accomplish tapping of the hole in the submerged object and engage the attaching screw threads with threads made in the bored hole.

References Cited
UNITED STATES PATENTS

| | | | |
|---|---|---|---|
| 1,006,532 | 10/1911 | Casazza | 114—44 XR |
| 1,289,957 | 12/1918 | Tambacopolo | 114—51 |
| 1,486,659 | 3/1924 | Hagman | 114—51 XR |

ANDREW H. FARRELL, *Primary Examiner.*